US008629866B2

(12) United States Patent
Betzler et al.

(10) Patent No.: US 8,629,866 B2
(45) Date of Patent: Jan. 14, 2014

(54) COMPUTER METHOD AND APPARATUS PROVIDING INTERACTIVE CONTROL AND REMOTE IDENTITY THROUGH IN-WORLD PROXY

(75) Inventors: Boas Betzler, Magstadt (DE); Paul B. Moody, Hyde Park, VT (US); Neil A. Katz, Parkland, FL (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 12/487,442

(22) Filed: Jun. 18, 2009

(65) Prior Publication Data

US 2010/0321378 A1   Dec. 23, 2010

(51) Int. Cl.
*G06T 15/00*   (2011.01)

(52) U.S. Cl.
USPC ............ 345/419; 707/104.1; 709/223; 713/2; 715/757; 715/758

(58) Field of Classification Search
USPC ................ 345/419; 707/104.1; 715/757, 758; 709/223
See application file for complete search history.

(56) References Cited

U.S. PATENT DOCUMENTS

| | | | |
|---|---|---|---|
| 6,853,398 B2 | 2/2005 | Malzbender et al. | |
| 6,999,083 B2 | 2/2006 | Wong et al. | |
| 7,319,992 B2 * | 1/2008 | Gaos | 706/62 |
| 7,958,453 B1 * | 6/2011 | Taing | 715/744 |
| 2004/0174431 A1 | 9/2004 | Stienstra | |
| 2007/0271301 A1 | 11/2007 | Klive | |
| 2008/0086696 A1 | 4/2008 | Sri Prakash et al. | |
| 2008/0098064 A1 | 4/2008 | Sherinian | |
| 2008/0177994 A1 * | 7/2008 | Mayer | 713/2 |
| 2008/0215995 A1 * | 9/2008 | Wolf | 715/758 |
| 2008/0262910 A1 * | 10/2008 | Altberg et al. | 705/14 |
| 2010/0146085 A1 * | 6/2010 | Van Wie et al. | 709/220 |
| 2010/0274848 A1 * | 10/2010 | Altmaier et al. | 709/203 |

FOREIGN PATENT DOCUMENTS

WO   WO 2006/100644 A3   9/2006

OTHER PUBLICATIONS

Farooq et al. "Avatar Proxies: Configurable Informants of Collaborative Activities". Chi 2003.*
Cavazza, M., et al., "Interacting With Virtual Characters in Interactive Storytelling," *International Conference on Autonomous Agents*, Jul. 15-19, 2002.
Fogel, E., et al., "A Web Architecture for Progressive Delivery of 3D Content," *Virtual Reality Modeling Language Symposium*, 2001 (No month found).
Wittkamper, M., et al., "Exploring Augmented Live Video Streams for Remote Participation," *Conference on Human Factors in Computing Systems*, Apr. 28-May 3, 2007.

* cited by examiner

*Primary Examiner* — Kimbinh T Nguyen
(74) *Attorney, Agent, or Firm* — Hamilton, Brook, Smith & Reynolds, P.C.

(57) ABSTRACT

Computer method and apparatus render views of a computer generated virtual world to a remote viewer. The invention method and apparatus establish an avatar of a resident user as a proxy on behalf of the remote viewer. The computer node of the resident user exports proxy avatar views of the virtual world to the remote viewer. The remote viewer computer renders the exported virtual world views without executing virtual world application programs.

20 Claims, 8 Drawing Sheets

COMPUTER METHOD AND APPARATUS PROVIDING INTERACTIVE CONTROL AND REMOTE IDENTITY THROUGH IN-WORLD PROXY

BACKGROUND

A Virtual Universe (VU) is a computer-based simulated environment intended for its residents to traverse, inhabit, and interact with through the use of avatars. Many VUs are represented using 3-D graphics and landscapes, and are populated by many thousands of users, known as "residents." Other terms for VUs include "metaverses", "virtual world" "3D Internet" and "virtual environment." Each of these terms are used interchangeably herein.

Often, the VU resembles the real world such as in terms of physics, houses (living space), and landscapes. Example VUs include: Second Life, Entropia Universe, The Sims Online, There, Red Light Center—as well as massively multiplayer online games such as EverQuest, Ultima Online, Lineage or World of Warcraft.

Various VU concepts are generally defined as follows.

An "avatar" is a graphical representation the user selects that others can see, often taking the form of a cartoon-like human. The user is sometimes referred to as the in-world camera operator or avatar controller, where "in-world" is relative to or within a given virtual universe.

An "agent" is the user's account, upon which the user can build an avatar, and which is tied to the inventory of assets the user owns.

A "region" is a virtual area of land within the VU, typically residing on a single server.

Technically speaking assets, avatars, the environment, and anything visual comprise respective UUIDs (universally unique identifiers—standard in the art) tied to (i) geometric data (distributed to users as textual coordinates), (ii) textures (distributed to users as graphics files such as JPEG2000 files), and (iii) effects data (rendered by the user's client according to the user's preferences and user's device capabilities).

Lastly, a "teleport offer" is an offer to instantaneously travel directly to a specific location.

Objects in a virtual universe are composed of one or more primitive objects such as cones, triangles and polygons. The more detailed an object is (i.e. the more primitive objects it is composed of) the longer the object will take to render and download. It is common for virtual world parcels to incorporate many objects in their design.

Various problems exist in virtual universes. For example, participation in a virtual universe requires a heavy weight client, server capacity and knowledge on how to operate in-world (i.e., in the virtual environment). A heavy weight client and required knowledge are barriers to entry for many people wishing to enter a virtual universe. The additional server capacity is costly for virtual universe operators. Methods are needed to reduce the barrier to entry for virtual universes.

BRIEF SUMMARY

The present invention addresses the foregoing problems. The present invention provides for lightweight viewing of in-world activity, lightens the server demand as only the avatar of the full client user (i.e., the in-world camera operator) is represented as a full inhabitant, and only the full client user's/in-world camera operator's knowledge of virtual world interaction is required. Those watching (i.e., remote viewers) do not need to understand the virtual world navigation intricacies. Furthermore, as actions in-world become routine and required as part of business processes, the ability to grant a proxy to the full client user/in-world camera operator on behalf of a remote viewer enables remote viewers to have momentary in-world representation and recording of their in-world actions.

In one embodiment, a computer method and apparatus of the present invention includes a proxy system and a proxy view exporter. Given a virtual environment having an avatar operated by a resident user, the proxy system establishes the avatar as a proxy on behalf of a remote viewer seeking to be a guest (non-resident) participant of the virtual environment. The proxy view exporter exports views of the virtual environment to the remote viewer from a computer node providing the avatar as the proxy. The computer node may be a full client and/or server of the virtual environment. The exporting is performed in a manner rendering virtual environment views to the remote viewer on a computer not required to be executing application programs of the virtual environment (thus a lightweight client).

The virtual environment is any of a video/3D video environment, gaming environment, virtual world and/or 3D graphics environment or the like. The proxy avatar (i.e., the resident user's avatar in the proxy state) enables the remote viewer to be a non-resident guest participant in the virtual environment. The proxy system enables the identity of the avatar to be changed to represent the remote viewer.

In accordance with one aspect of the present invention, the proxy system enables the remote viewer to interactively control the avatar in the virtual environment. This includes granting a "power of avatar" to the remote viewer.

Other aspects enable the remote viewer and the resident user to (i.e., in-world operator) communicate. Communication may be by text (e.g., a chat session) and/or voice (e.g., voice over IP).

Another aspect employs indications (e.g., visual, graphical, and/or image-based indicators or the like) in the virtual environment to convey that the avatar is serving as a proxy on behalf of a remote/non-resident viewer or a group of remote/non-resident viewers.

Accordingly inventive features provided by the present invention include:

(1) A system to communicate in-world and with the in-world camera operator/avatar controller (chat and/or voice) from a non-VU client (remote viewer).

(2) A system to reveal in-world who (remote viewer or outside VU user) is viewing vicariously through the in-world camera operator/avatar controller, or when representing a group of remote viewers, reveal the number of members of the group.

(3) A system to grant 'power of avatar' and proxy to an in-world camera operator (full client user) to allow him to 'act as you' (remote viewer/group) in-world. The remote viewer's Access Control List or permissions, Identity and Avatar are used temporarily by the in-world camera operator.

The proposed invention contains numerous advantages including, but not limited to:

(1) Reduced barrier of entry for participating in a virtual world/environment event.

(2) Increased awareness of remote viewers (receiving the video feeds).

(3) Granting proxy rights and access for remote user actions in-world.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Components of the invention and relevant interfaces are described below. Each component is used to provide the benefits listed above. It is understood that various other implementations and component configurations are suitable. The following is for representative, non-limiting, illustrative purposes.

Figure 1:
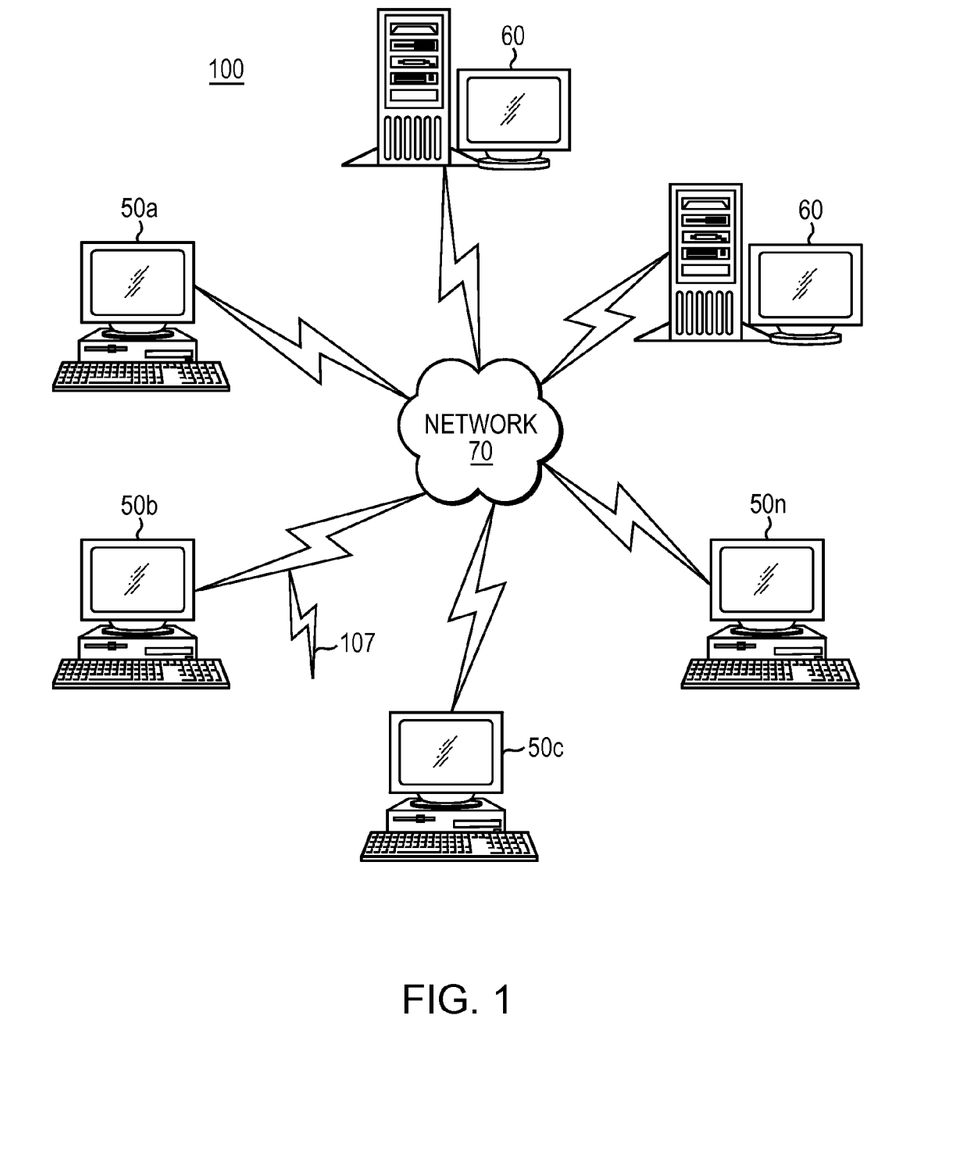
FIG. 1 is a schematic view of a computer network in which embodiments of the present invention are deployed.

FIG. 1 illustrates a computer network or similar digital processing environment in which embodiments 100 of the present invention may be implemented.

Client computer(s)/devices 50a, b ... n (50 generally) and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Typically one or more of the servers 60 supports the virtual environment 40 (FIG. 3), and heavy weight (full) clients 50a, 50b support respective avatars 25, 35 of full client users (in-world camera operators/avatar controllers). Common virtual world simulator techniques and in-world camera operation/avatar control techniques are employed for general operation. Further, a light weight client 50c supports an out-of-world/remote viewer 11 (FIG. 3) as a temporarily participating guest of the virtual world 40. In a preferred embodiment, the lightweight client 50c comprises a browser 13 and at least a video player plug-in 18 or the like (as made clear below).

A user of full client 50a controls avatar 25. In accordance with the present invention, avatar 25 at various times may serve as a proxy avatar 15. The present invention system 100 allows the full client 50a user/avatar 25 controller to stream a view from in-world 40 to the standard video player 18 of lightweight client 50c. The full client 50a user/avatar 25 controller can stream a video view with interactive control and remote identity of the remote viewer/guest participant 11 through the in-world proxy avatar 15 (mode or state of avatar 25). In this way, there is a reduced barrier of entry into virtual world environment 40 by eliminating the requirement of a heavy weight client, 50a, 50b and there is a reduced server 60 load on the virtual world infrastructure as will be further made clear below.

Figure 2:
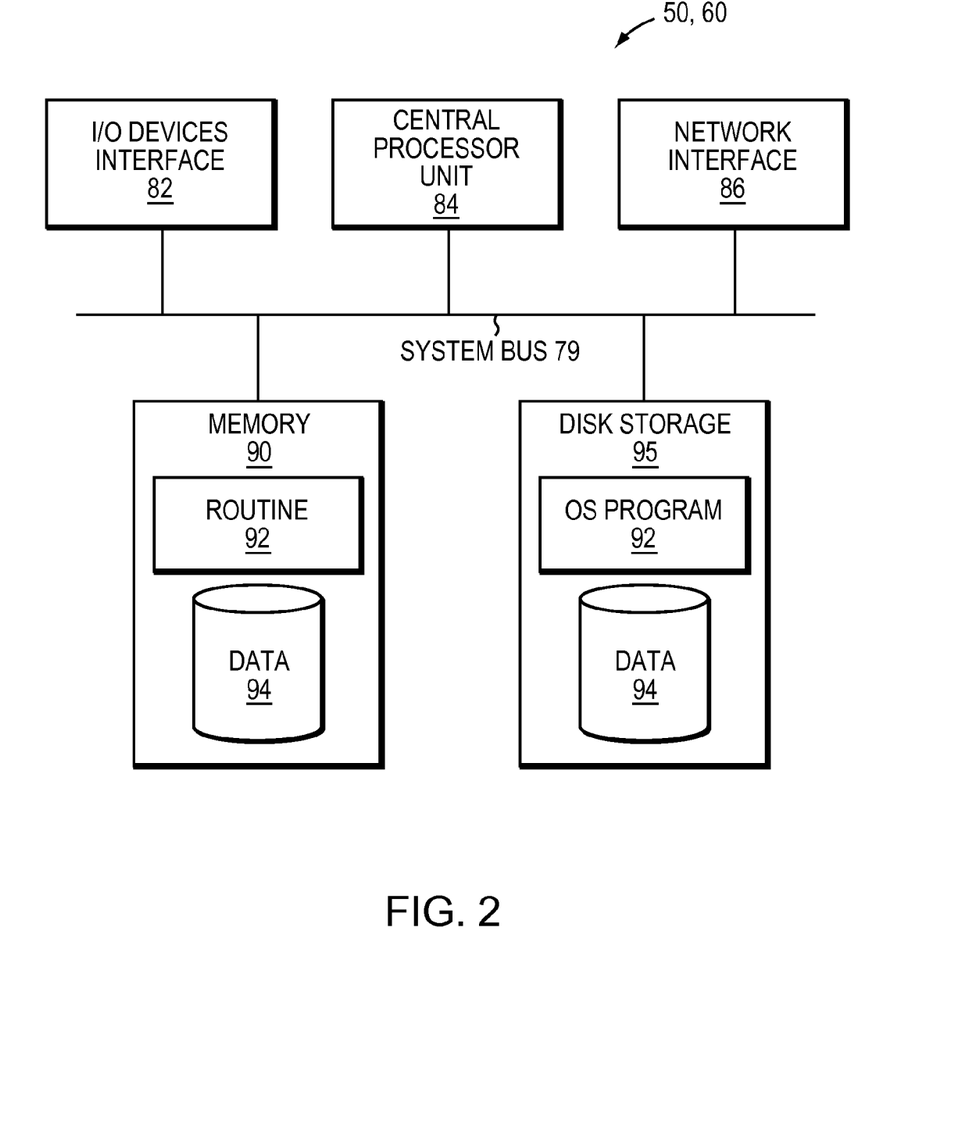
FIG. 2 is a block diagram of a computer node in the network of FIG. 1.

Continuing from FIG. 1, FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment 100 of the present invention (e.g., lightweight client 50c, in-world proxy avatar 15, power of avatar 30 and the related code described above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 3:
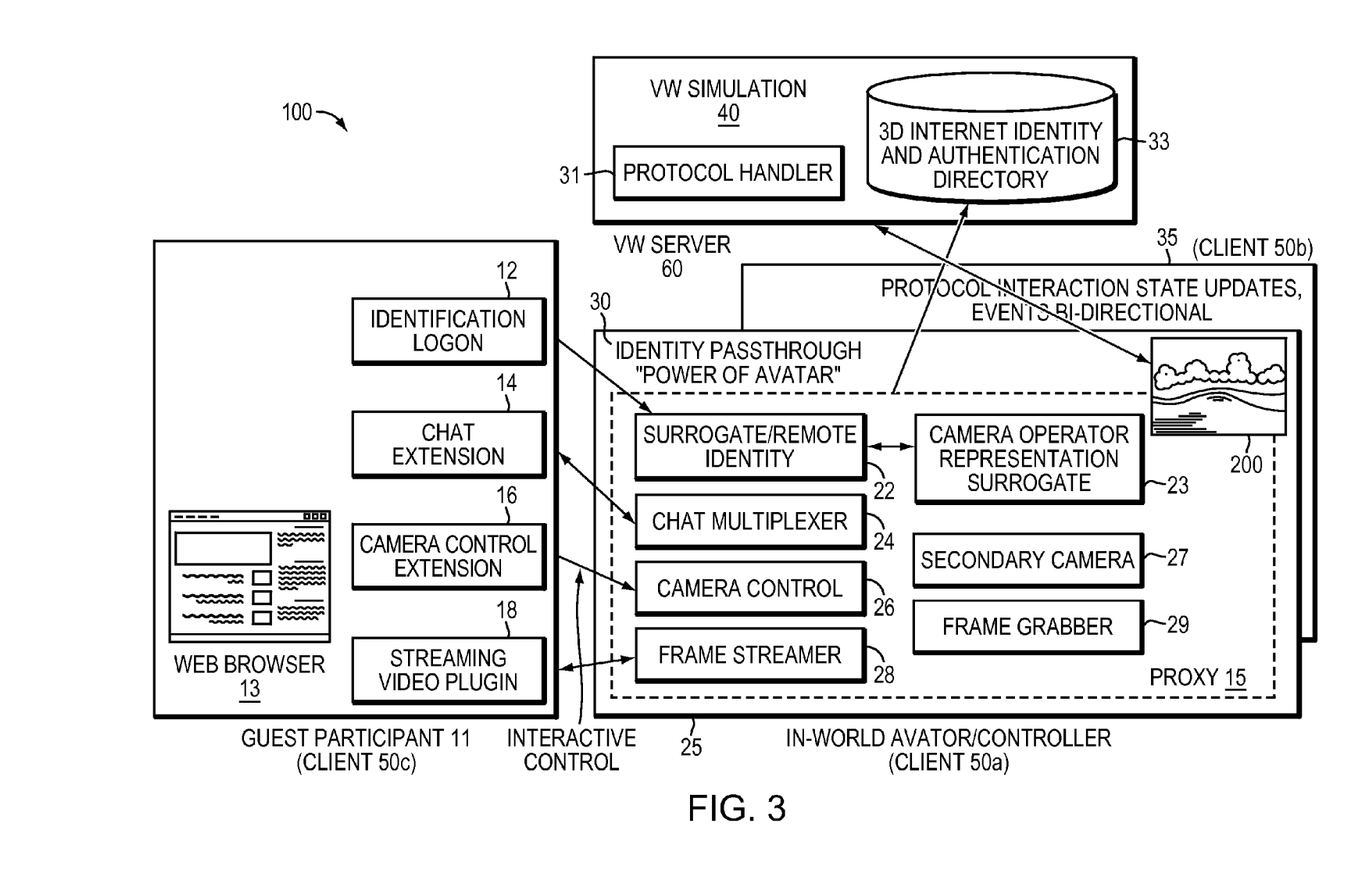
FIG. 3 is a block diagram of an in-world proxy system embodying the present invention.

Continuing with FIG. 3, as mentioned above, the users of full clients 50a, 50b, 50n control respective avatars 25, 35. Avatars 25, 35 may be configured to serve as respective proxies 15. For simplicity of description, FIGS. 3 through 7 and the following at times discuss avatar 25 having respective proxy state/proxy avatar 15 corresponding to remote viewer 11. It is understood that avatars 35 of other full clients 50b, 50n may similarly have respective proxy states on behalf of various remote viewers 11. For each such avatar 25, 35, the demand on server 60 is the equivalent of only one (and not two) respective full inhabitant of virtual world 40 where respective proxy avatar 15 is a conceptual and alternative identity of the subject avatar 25, 35. Thus proxy avatar 15 is drawn in phantom (dotted lines) within avatar 25 controlled by the user of full client 50a in FIG. 3. FIGS. 4-7 provide further details and illustrate alternative embodiments. Each of FIGS. 3-7 are for purposes of illustrating non-limiting, exemplary Virtual World Proxy Systems 100 of the present invention as discussed next.

By way of brief overview in embodiments of the present invention, the proxy system 100 provides methods to export the point of view from an avatar 25, and in particular from an in-world proxy avatar 15 thereof. The proxy system 100 also provides methods of or otherwise enables communications between full client 50a user/avatar 25 controller and those (remote viewer(s)/guest) 11 viewing through proxy avatar 15. The proxy system 100 also enables remote viewers 11 viewing via proxy to interact with the virtual world 40 if permission is granted. Further, the proxy system 100 provides to the remote viewer 11 the ability to grant avatar 25 controller/full client 50a user temporary transfer of in-world identity (from initial in-world avatar 25 user to corresponding proxy avatar 15 representative of remote viewer 11), and to enable the in-world user/avatar 25 controller to operate proxy avatar 15 to act on behalf of the granting viewer 11. Each of these features are implemented in a preferred and various alternative embodiments as follows.

Point of View Export

Figure 4:
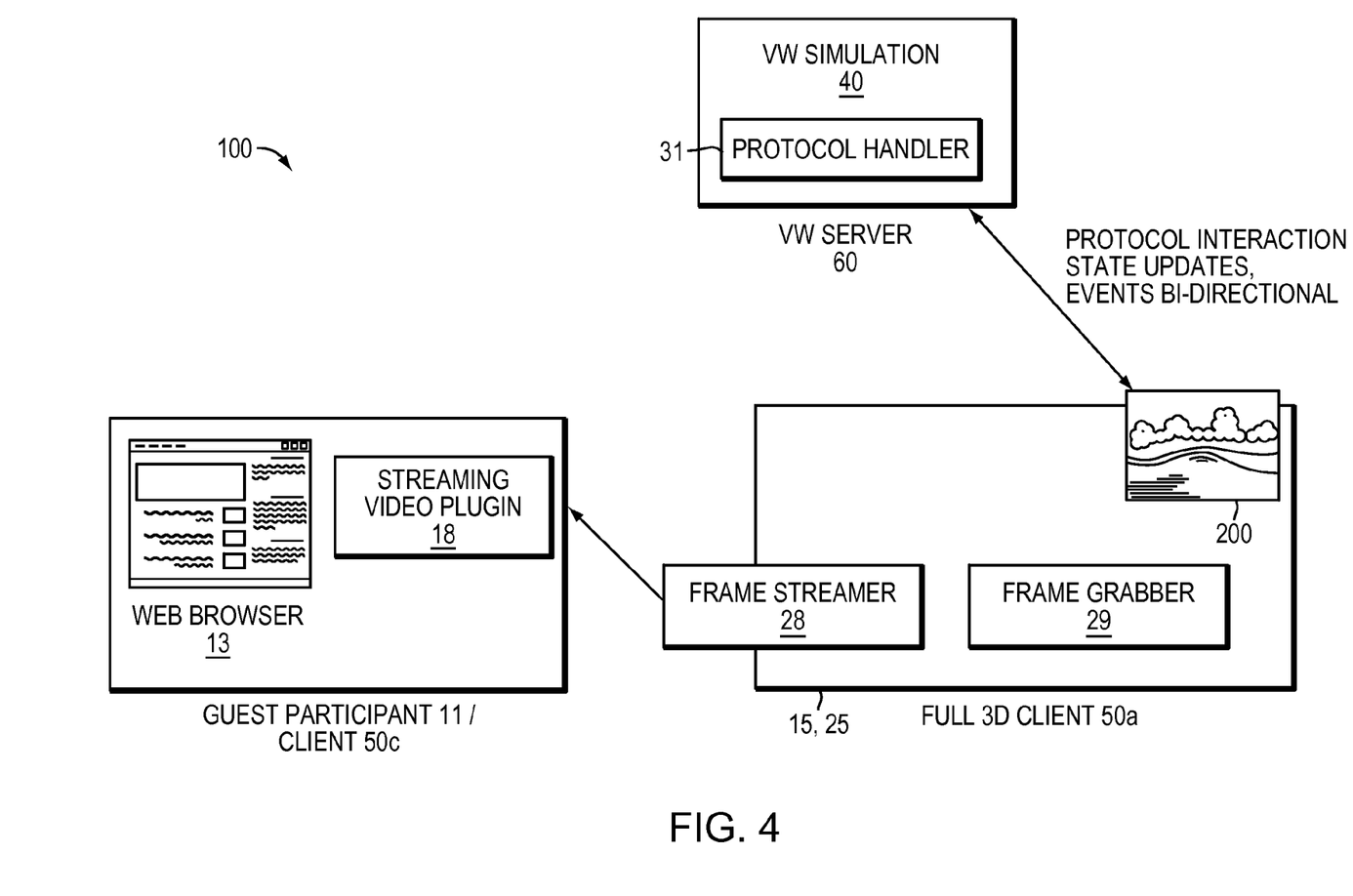
FIG. 4 is a block diagram of another embodiment exporting proxy views.
Figure 5:
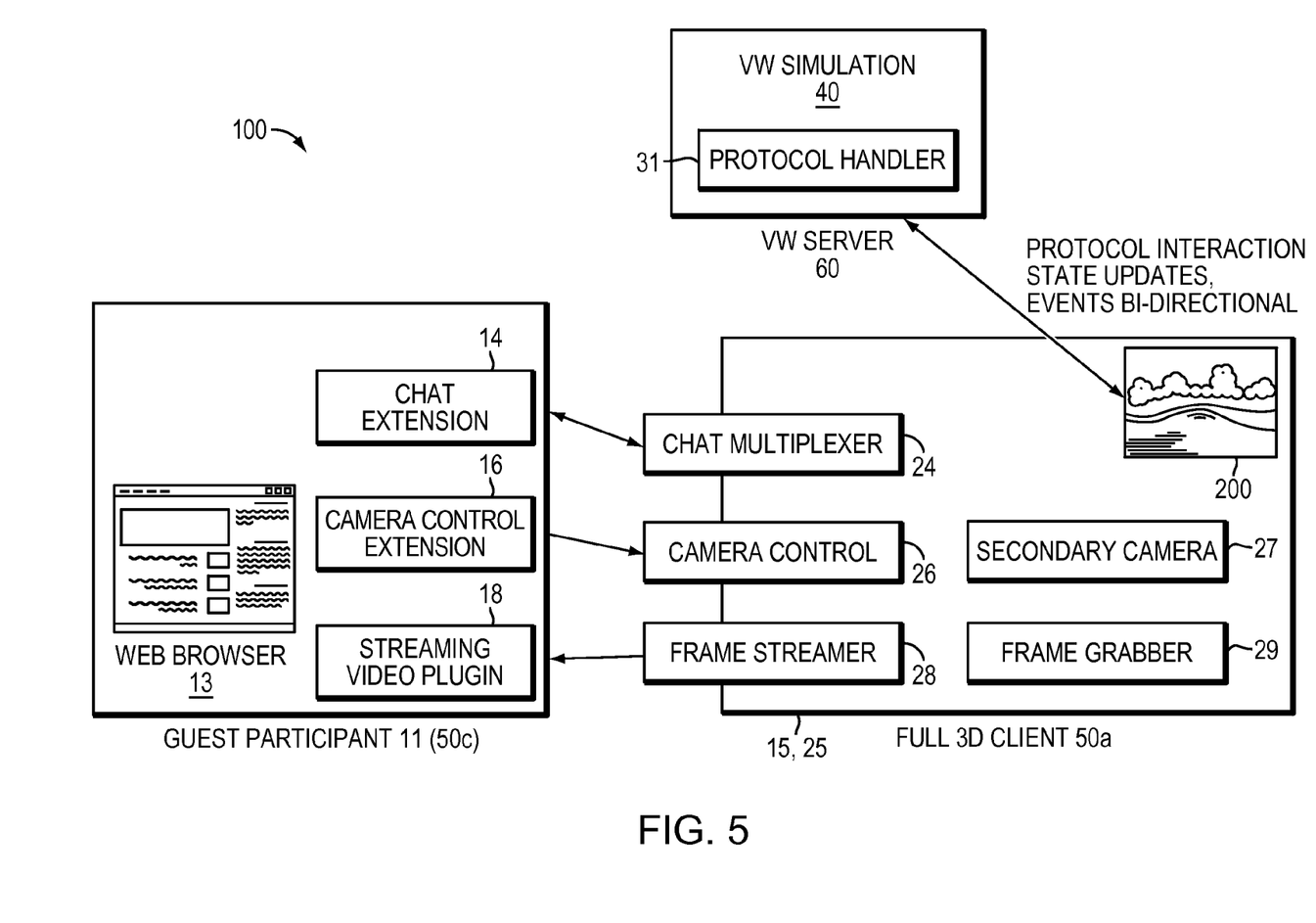
FIG. 5 is a block diagram of another embodiment with exported proxy views and added communications between clients.

Embodiments include methods to export an avatar's 25, 35 point of view to non-virtual world 40 members/viewers 11 outside of the virtual world 40. In some embodiments, the virtual world server 60 contains the export components 28, 29 (as in FIGS. 6 and 7), other embodiments may place the export components 28, 29 on the heavy weight client 50a, 50b (as shown in FIGS. 3-5). In the server 60 environment, protocol handler 31 notes the avatar's location and orientation along with the objects in the field of view of the avatar 25, 35. The server 60 uses known virtual world rendering techniques to render the view 200 of the avatar 25, 35. This view 200 is then converted to a still image or frame at 29. The server 60 may create multiple frames per second and place each frame into a buffer 28 for transmission to lightweight client's 50c interested in viewing these frames. The client 50c (for example, streaming video player 18 in a lightweight clients 50c) displays each frame as received by the server 60. If enough frames are transmitted per second, a remote viewer 11 viewing the client 50c perceives the still frames as a continuous stream and not independent still images.

In most embodiments, another step is inserted to reduce the bandwidth required to transmit the still images, this step is called encoding. Example encoding techniques include MPEG2, MPEG4, H. 264, FLV and many others. Additionally, the server 60 notes any sounds created by the avatar or the environment and transmits those to viewing clients 50, potentially encoded with known audio encoding technology such as MP3, WMA or others.

Communications

With reference to FIGS. 3 and 5, embodiments employ a chat extension 14 coupled for communication with chat multiplexer 24 of full client 50a and employ a camera control extension 16 operatively coupled to interactively control camera controller 26 of client 50a. In these extensions 14, 16 (or effectively similar ones), the present invention contains methods to permit communication between full client 50a user/controller of in-world proxy avatar 15 and those 11 viewing that avatar's exported point of view 200. Communication may be textual in nature and received via HTTP requests from remote viewers 11 viewing the in-world proxy avatar's 15 point of view via a browser 13.

Communications directed back to the remote viewer 11 may also be textual in nature and transmitted to the browser 13 as an HTTP response. In other embodiments, voice communication may be permitted using known VOIP (voice over IP) methodologies proxied between the avatar 15 and the browser 13.

Figure 6:
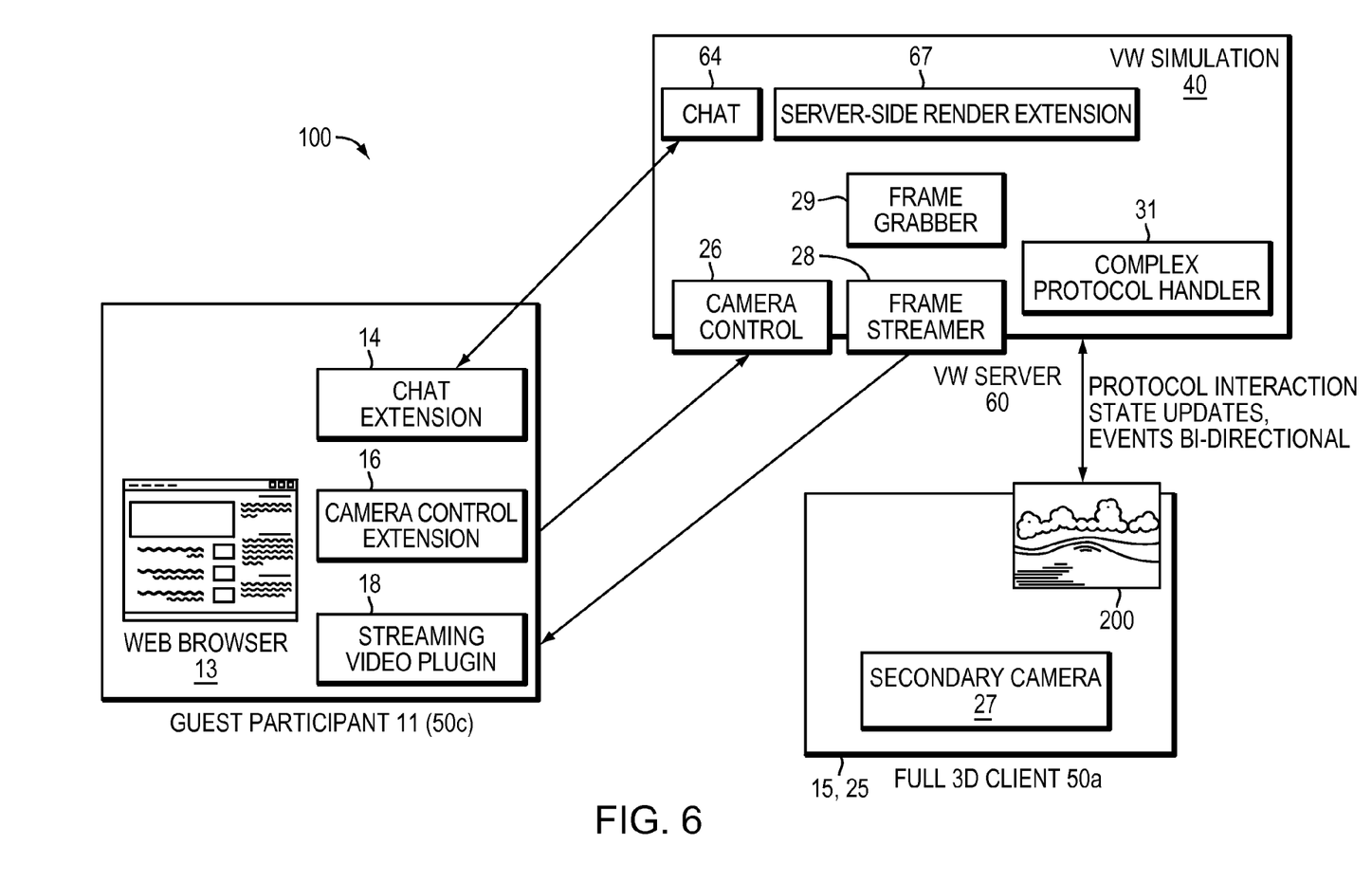
FIG. 6 is a block diagram of another embodiment of remote viewer control of in-world camera.

For non-limiting example, in one embodiment the remote viewer's browser 13 is augmented to permit the display of audio/video content 18 alongside navigation 16, communication 14 and standard web browser options. In most embodiments, the augmentation is one or more extensions 14, 16, 18 to the browser 13 installed via standard methodologies. The extension 14, 16, 18 may not be specific to the invention. For example, the proposed invention may make use of standard browser extensions such as Macromedia Flash or Apple Quicktime. Avatar "power granting" requests, and navigation may be invoked using standard HTML and HTML buttons. As illustrated in FIG. 6, requests may be transmitted to the virtual world system server 60 using standard browser HTTP request/response methodologies. Communications may be textual in nature rendered as HTML forms and content may be transmitted to the remote viewer 11 (his browser 13) using standard browser HTTP request/response methodologies. The browser 13, through standard HTML and scripting methodologies may poll the proxy system 100 for outbound communications using HTTP requests. Voice communications with the in world avatar 15, 25 (via chat module 64 of server 60 and chat multiplexer 24 of client 50a) may be enabled through another browser plug-in (e.g., chat extension 14) that supports voice over IP.

Navigation

Continuing with FIGS. 3 and 5, navigation and "power of avatar" 30 requests are transmitted within the proxy system 100 via HTTP requests. Requests to grant "power of avatar" 30 are presented to the full client 50a user/controller of in-world proxy avatar 15 in question and responses are transmitted back to the requester 11 via HTTP responses. Navigation requests from remote viewer 11 (via camera control extension 16) are processed only if "power of avatar" 30 is granted by the in-world avatar 25, 15 controller/full client 50a user. Navigation requests 16 are received via HTTP requests. A Navigation request 16 may include movement, orientation, teleportation or a plurality of other known or common virtual world functions. The proxy system 100 executes these functions by camera controller 26 in operative communication with camera control extension 16 as if the requested functions were executed by a heavy weight virtual world client 50a, 50b.

In-World Representation

In-world representation of those 11 remotely viewing the virtual world 40 via the in-world proxy avatar 15 (state or mode of avatar 25) is described by the proxy system 100 Identity and Authentication directory (data store) 33. The data store 33 includes but is not limited to: listing the number of remote viewers 11 represented by the in-world proxy avatar 15, identity of avatar 25, list of names and likenesses of remote viewers 11 or their respective avatars of other virtual environments or the like.

Full In-World Proxy

Furthermore, the proxy system 100 permits the in-world proxy avatar 15 (state of avatar 25) to take on the avatar appearance of one of the remote viewers 11 and to have access to the remote viewer's 11 credentials to act in-world 40 as if they were the remote viewer's 11 avatar. At logon identification module 12, the remote viewer 11 grants the full client 50*a* user controlling in-world proxy avatar 15/avatar 25 permissions to access, for in-world 40 use, inventory, avatar descriptions and credentials. In turn, the in-world proxy avatar 15/avatar 25 takes on the representation of the remote out-of-world viewer 11 as if the remote viewer 11 was in-world (and not viewing through the in-world proxy avatar 15 identity of user avatar 25). In response, server 60 records this change or update in identity in data store 33. Actions performed by the in-world proxy avatar 15 version of avatar 25 are logged at surrogate/remote identity 22 and surrogate camera operator 23 as performed with permission by the remote viewer 11. The secondary camera 27 also tracks these actions performed by proxy avatar 15 representing remote viewer 11.

Power of Avatar

Granting "power of avatar" 30 is the process by which a remote viewer 11 (i.e., a non-member, guest participant outside the virtual world 40 and viewing the exported point of view of an in-world avatar 25) may effectively take control of the proxy avatar 15. Requests are transmitted from the browser 13 of the requesting viewer 11 to the proxy system 100 and either granted or denied by the in-world controller of the avatar 15, 25/full client 50*a* user. In most embodiments, if "power of avatar" 30 is granted, the granter (in-world avatar 15, 25 controller/full client 50*a* user) may revoke power of avatar at any point. "Power of avatar" 30 permits remote viewers 11 to interact with the virtual world 40 without installation of a heavy weight application, creation of an avatar or other such barriers to virtual world 40 entry. When "power of avatar" 30 is granted restrictions, sometimes called ACLs (access control lists or permissions), may be placed on the new controller/remote viewer 11 of the avatar 15, 25. For example the remote viewer 11/new controller may be restricted from spending virtual world monies or entering specific regions in the virtual world 40. Known techniques in the art are used to implement these restrictions, for example based on restriction attributes indicated in data store 33.

Avatar Rendering Augmentations

Embodiments of the present invention may augment avatar 15, 25 rendering using two distinct methods described below. Render extension 67 (FIG. 6) of server 60 is employed to implement these augmentations.

Rendering Augmentation

Upon invocation of point of view export, the user's avatar 15, 25 (i.e., avatar 25 in the proxy 15 state) rendering may be augmented to communicate to others in-world that the avatar's point of view is being exported to others outside of the virtual universe 40. Such information may be of use to other avatars who may think they are having a private interaction with another avatar. Rendering augmentations may vary by embodiment, but all embodiments' augmentations should convey with certainty that the interaction with the avatar 15, 25 is not private. Some examples include rendering a camera above the avatar's shoulder, rendering a group of people behind the avatar or other such augmentation. In some embodiments, prior to viewing the point of view export, remote viewers 11 may be required to provide a picture to the proxy system 100 at identification logon 12. The embodiment system displays the picture behind or above the proxy avatar 15 (i.e., avatar 25 in the proxy state) presently exporting its point of view.

Power of Avatar Rendering Augmentation

Some embodiments may support additional augmentations when a remote viewer 11 outside the virtual world has been granted "power of avatar" to control the avatar 15, 25 (i.e., proxy avatar 15 state of avatar 25). Again, embodiments may vary but augmentations should clearly convey that the avatar 15, 25 is not presently under control of the avatar owner (full client 50*a* user). For example, the avatar 15, 25 (proxy avatar 15 state of avatar 25) may be rendered with puppet strings attached to the avatar's limbs indicating that the avatar is under external viewer 11 control. In other embodiments, text may be rendered above the avatar 15, 25 indicating the name of the remote viewer 11 presently controlling the avatar.

Alternate Embodiments

Figure 7:
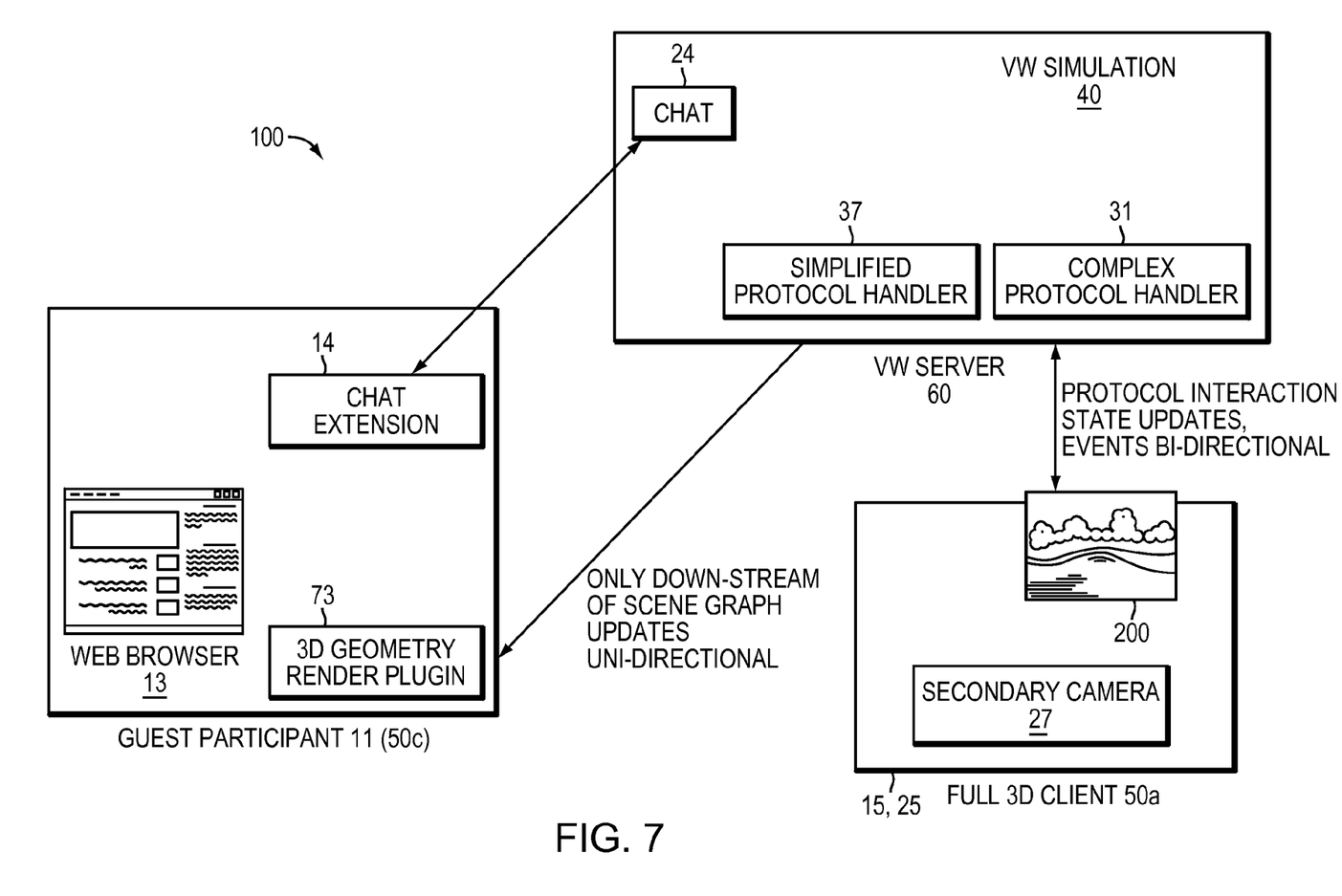
FIG. 7 is a geometry-based embodiment of the present invention.

It should be noted that the provided specification is for illustrative purposes only and is not intended to limit the proposed invention. As those skilled in the art know numerous modifications may be possible without deviating from the scope and spirit of the invention. As such, some additional embodiments are depicted in FIGS. 4, 5 and 7 and discussed below:

Simple Client Streaming Embodiment (FIG. 4)

In this embodiment, the heavy weight virtual universe client 50*a* proxies between the virtual universe 40 and browser clients 50*c*. Remote viewer's 11 browser 13 employs the streaming video plugin 18 described in FIG. 3 while full client 50*a* employs the frame buffer 28 and frame generation unit 29 described above. This embodiment is limited to streaming video (proxy view export) and no additional interaction (e.g., communication, navigation, etc) between the browser client 50*c* and full 3D client 50*a* is supported.

Advanced Client Streaming Embodiment (FIG. 5)

In this embodiment the heavy weight virtual universe client 50*a* proxies between the virtual universe 40 and browser clients 50*c*. Remote viewer browser 13 employs the streaming video extension 18, chat extension 14 and camera control extension 16 supporting proxy view export, communications and navigation respectively, discussed above in FIG. 3. Full client 50*a* has the corresponding operative/interactive video-audio streaming subsystem (framer 29 and buffer 28), communications module (chat multiplexer 24) and camera controller 26, secondary camera 27 unit, described previously. This embodiment permits the streaming video/proxy view export methods, communications between full client 50*a* user and remote viewer 11, and navigation methods described above.

Browser Rendering Embodiment (FIG. 7)

In this embodiment, the virtual universe server 60 transmits geometry information and textures to the browser 13 of remote viewer 11/client 50*c*. A 3D geometry rendering plug-in 73 within the browser 13 converts these textures and geometries (i.e., the transmitted data) into rendered images and motions. This implements the proxy view export (streaming video). The geometry based rendering updates downstream of scene graph and is unidirectional. Thus a simplified protocol handler 37 is employed to support the geometry based rendering while the complex protocol handler 31 (described above) provides protocol interaction, state updates and bidirectional events with full client 50*a*.

Figure 8:
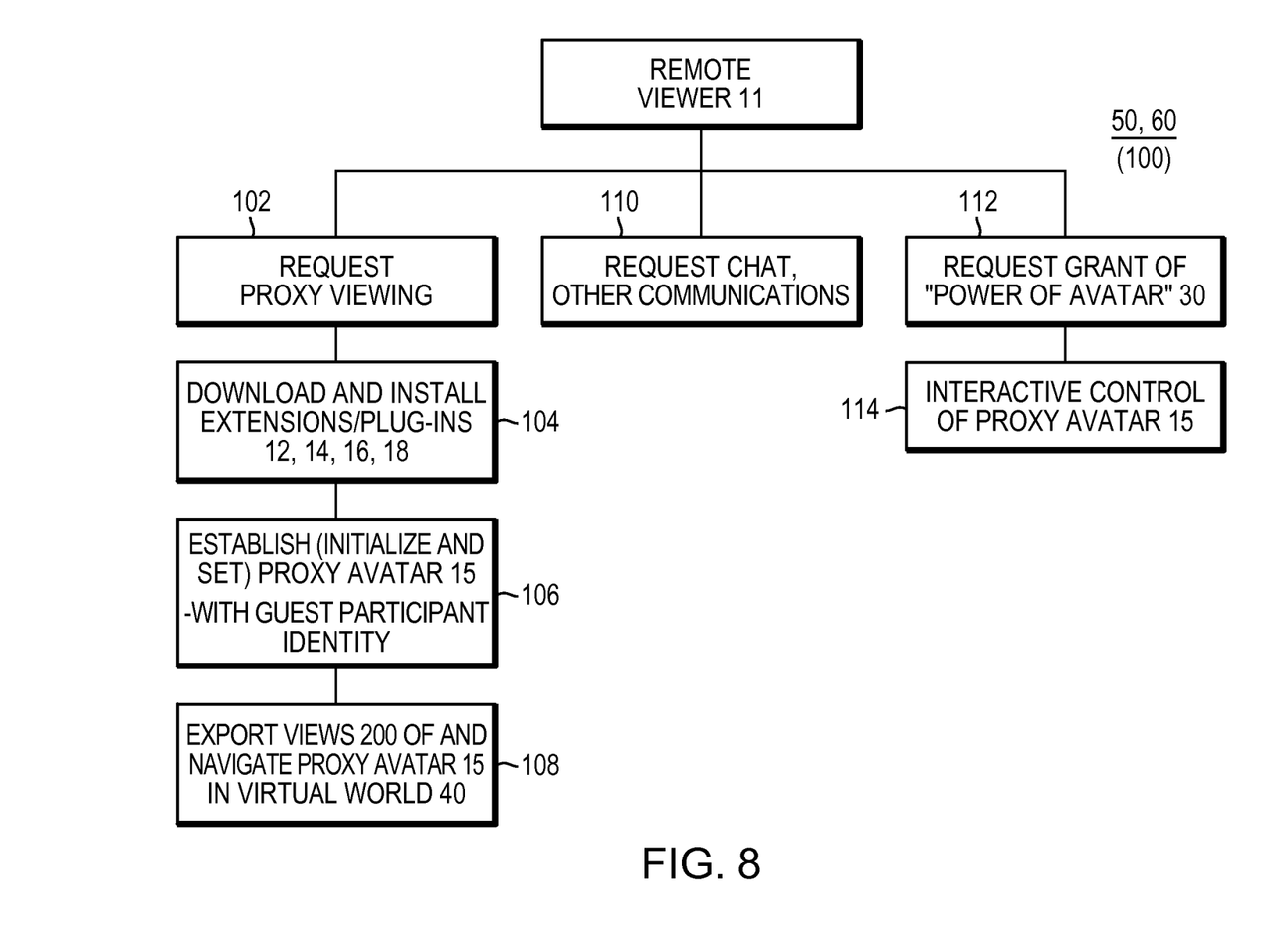
FIG. 8 is a flow diagram of the FIG. 3 embodiment.

With reference now to the flow diagram of FIG. 8, processing of the FIG. 3 embodiment is further illustrated and detailed. A remote viewer 11 (at client 50c) is initially a non-participant and non-member of the subject virtual world 40. With the present invention proxy system 100, remote viewer 11 requests to receive views 200 by way of proxy (step 102). Client 50c transmits the request to full client 50a and/or server 60 as working members of virtual world 40.

In one embodiment, server 60 responsively downloads (step 104) to the browser 13 of requesting client 50c logon identification module 12, chat extension 14, camera control extension 16 and streaming video plug-in 18 as needed. A wizard or other known techniques for installing (step 104) the downloaded modules/plug-ins 12, 14, 16, 18 (or equivalent plug-ins) to client 50a is employed.

In response to remote viewer 11 interactively operating the identification logon 12 seeking guest participant status in virtual world 40, full client 50a initializes proxy avatar 15 (state of avatar 25). This includes setting surrogate remote identity 22, camera operator representation surrogate 23, chat multiplexer 24, camera control 26, secondary camera 27 and streaming video export subsystem 28, 29 previously described. Step 106 is illustrative of establishing avatar 25 as a proxy on behalf of remote viewer 11. In response to remote viewer 11 granting to the user of full client 50a permission for the proxy avatar 15 (state of avatar 25) to take on identity of the remote viewer 11/guest participant, client 50a registers the identity in server 60 authentication directory 33 (step 106).

In communication with server 60 protocol handler 31, full client 50a exports (step 108) to remote viewer 11/client 50c streaming views 200 of virtual world 40 as seen through proxy avatar 15. The streaming video export subsystem (i.e., frame grabber 29 and frame buffer/generator 28) implements the proxy view export as previously described. The user of full client 50a, through surrogate identity and representation 22, 23, navigates and controls the camera 26, 27 of proxy avatar 15 in virtual world 40 (at step 108). Step 108 may also implement the avatar rendering augmentation detailed above.

Throughout proxy avatar 15 operation and use, the remote viewer 11 and full client 50a users communicate with each other via chat extension 14 and chat multiplexer 24 previously described. Step 110 implements these communication requests/responses. To further interact with virtual world 40 using proxy avatar 15, the remote viewer 11 may request "power of avatar" 30 from full client 50a user (step 112). Upon grant of "power of avatar" 30, step 114 supports remote viewer 11 interactive control of proxy avatar 15. Camera control extension 16 of remote viewer 11 client 50c, in operative communication with camera controller 26 and secondary camera 27 of full client 50a, implement the remote viewer 11 under "power of avatar" 30 controlling of proxy avatar 15. In particular, at step 114 the remote viewer 11 navigates and controls the in-world camera of proxy avatar 15/avatar 25 in virtual world 40. Step 114 may also implement the "power of avatar" rendering augmentation described earlier.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer method of operating an individual avatar in a computer virtual environment, the method comprising:
   communicatively coupling a first computer node to a server supporting a virtual environment;
   sending a video stream of the virtual environment from the first computer node to a second computer node, the first computer node running a full client application of the virtual environment and the second computer node running no application program of the virtual environment and thus being a lightweight client, wherein said full client application renders the virtual environment to a user of the first computer node and handles functions to control an individual avatar in said virtual environment, the individual avatar being controlled by the user of the first computer node, and wherein said lightweight client, by receiving the video stream from the first computer node with the user of the first computer node controlling the individual avatar, (a) relieves the second computer node from being required to execute any application program of the virtual environment, and (b) enables a user of the second computer node to be a remote viewer of the virtual environment, and the first computer node running the full client application includes establishing one state of the individual avatar as corresponding to the remote viewer, wherein the user of the first computer node and the remote viewer of the second computer node are different from each other, the user of the first computer node, through the first computer node operating the individual avatar (i) in the one state on behalf of the remote viewer and (ii) in a different state as representative of himself, and the user of the first computer node operates the individual avatar in the one state to export views of the virtual environment in the video stream and to render virtual environment views through the video stream to the remote viewer on the second computer node;
   using the first computer node, receiving a request from the remote viewer through the second computer node to take over control of the individual avatar; and
   receiving at the first computer node communications from the second computer node containing functions for control of the individual avatar in the one state, such that a same avatar is used by both the user of the first computer node and the user of the second computer node.

2. A computer method as claimed in claim 1 wherein the virtual environment is any one of a video environment, a gaming environment, a virtual world and a 3D graphics environment.

3. A computer method as claimed in claim 1 wherein the user of the first computer node is a resident of the virtual environment;
   the step of establishing the one state of the individual avatar includes enabling the remote viewer to be a non-resident, guest participant in the virtual environment.

4. A computer method as claimed in claim 1 further comprising:
   changing identity of the individual avatar to represent the remote viewer.

5. A computer method as claimed in claim 1 further comprising:
   enabling the remote viewer to interactively control the individual avatar in the virtual environment.

6. A computer method as claimed in claim 5 wherein the step of enabling the remote viewer includes granting power of the individual avatar to the remote viewer.

7. A computer method as claimed in claim 1 further comprising enabling the remote viewer of the second computer node and the user of the first computer node to communicate to each other.

8. A computer method as claimed in claim 7 wherein the remote viewer and the user communicate to each other by any combination of text and voice.

9. A computer method as claimed in claim 1 further comprising indicating in the virtual environment the individual avatar being in the one state of the individual avatar.

10. Computer apparatus rendering virtual environment views comprising:
   a first computer node coupled to a server supporting a virtual environment and the first computer node running a full client application of the virtual environment, wherein the full client application renders the virtual environment to a user of the first computer node and handles functions to control an individual avatar in said virtual environment, the individual avatar being controlled by the user of the first computer node,
   a proxy system executed by the first computer node and enabling sending a video stream of the virtual environment from the first computer node to a second computer node, the second computer node running no client application program of the virtual environment and thus being a lightweight client, and wherein said lightweight client, by receiving the video stream from the first computer node with the user of the first computer node controlling the individual avatar, (a) relieves the second computer node from being required to execute any application program of the virtual environment, and (b) enables a user of the second computer node to be a remote viewer of the virtual environment, and the first computer node running the full client application includes enabling configuration of one state of the individual avatar as corresponding to the remote viewer, wherein the user of the first computer node and the remote viewer are different from each other, the user of the first computer node, through the first computer node operating the individual avatar (i) in the one state on behalf of the remote viewer and (ii) in a different state as representative of himself;
   a proxy view exporting subsystem coupled to the proxy system, the proxy view exporting subsystem exporting views of the virtual environment to the remote viewer from the first computer node providing the individual avatar in the one state, wherein the user of the first computer node operates the individual avatar in the one state to export views of the virtual environment in the video stream and to render virtual environment views through the video stream to the remote viewer on the second computer node,
   wherein the first computer node receives a request from the remote viewer through the second computer node to take over control of the individual avatar; and
   the first computer node receives communications from the second computer node containing functions for control of the individual avatar in the one state, such that a same avatar is used by both the user of the first computer node and the user of the second computer node.

11. Computer apparatus as claimed in claim 10 wherein the virtual environment is any one of a video environment, a gaming environment, a virtual world and a 3D graphics environment.

12. Computer apparatus as claimed in claim 10 wherein:
   the user of the first computer node is a resident of the virtual environment; and
   the proxy system enables the remote viewer to be a non-resident, guest participant in the virtual environment.

13. Computer apparatus as claimed in claim 10 wherein the proxy system changes identity of the individual avatar to represent the remote viewer.

14. Computer apparatus as claimed in claim 10 wherein the proxy system further enables the remote viewer to interactively control the individual avatar in the virtual environment.

15. Computer apparatus as claimed in claim 14 wherein the proxy system further enables the user of the first computer node to grant power of the individual avatar to the remote viewer of the second computer node.

16. Computer apparatus as claimed in claim 10 wherein the proxy system further comprises a communications module that enables the remote viewer of the second computer node and the user of the first computer node to communicate to each other.

17. Computer apparatus as claimed in claim 16 wherein the remote viewer and the user communicate to each other by any combination of text and voice.

18. Computer apparatus as claimed in claim 10 wherein the proxy system further employs indicators in the virtual environment indicating that the individual avatar is in the one state of the individual avatar.

19. Computer apparatus as claimed in claim 18 wherein the indicators are any combination of visual, graphical and image-based.

20. Computer program product rendering views of a computer virtual world, the computer program product comprising:
   a non-transitory computer useable medium having computer useable program code embodied therewith, the computer useable program code comprising:
   computer useable program code configured to send a video stream of a virtual world from a first computer node to a second computer node, the virtual world being hosted by a server, and the first computer node coupled for communication to the server and running a full client application of the virtual world, and the second computer node running no client application of the virtual world such that the second computer node is a lightweight client, wherein said full client application renders the virtual world to a user of the first computer node and handles functions to control an individual avatar of the user in the virtual world, the individual avatar being controlled by the user of the first computer node, and wherein said lightweight client by receiving the video stream from the first computer node with the user of the first computer node controlling the individual avatar (a) relieves the second computer node from being required to execute any application program of the virtual world, and (b) enables a user of the second computer node to be a remote viewer of the virtual world, and the first computer node running the full client application includes forming one state of the individual avatar corresponding to the remote viewer, wherein the user of the first computer node and the remote viewer are different from each other, the user of the first computer node, through the first computer node operating the individual avatar (i) in the one state on behalf of the remote viewer and (ii) in a different state as representative of himself, and the user of the first computer node operates the individual avatar in the one state to export views of the virtual world in the video stream and to render virtual world views through the video stream to the remote viewer on the second computer node; and
   computer useable program code configured to receive at the first computer node: (i) a request from the remote viewer through the second computer node to take over control of the individual avatar, and (ii) communications from the second computer node containing functions for control of the individual avatar in the one state, such that a same avatar is used by both the user of the first computer node and the user of the second computer node.

* * * * *